United States Patent [19]
West

[11] Patent Number: 5,845,891
[45] Date of Patent: Dec. 8, 1998

[54] FISHING ROD HOLDER

[76] Inventor: Charles West, 427 N. Seneca, Wichita, Kans. 67203

[21] Appl. No.: 891,582

[22] Filed: Jul. 11, 1997

[51] Int. Cl.[6] .................................................. A45B 25/28
[52] U.S. Cl. ......................... 248/538; 248/515; 211/70.8
[58] Field of Search ................................... 248/538, 515; 211/70.8

[56] References Cited

U.S. PATENT DOCUMENTS

| | | | |
|---|---|---|---|
| 1,876,478 | 9/1932 | Van Duzer | 248/538 |
| 4,097,017 | 6/1978 | Hazlitt | 248/538 |
| 4,235,409 | 11/1980 | Cummings | 248/538 |
| 5,115,598 | 5/1992 | Shaw | 248/538 |
| 5,152,494 | 10/1992 | Frunzar | 248/538 |
| 5,184,797 | 2/1993 | Hurner | 248/538 |
| 5,313,734 | 5/1994 | Roberts | 248/538 |

*Primary Examiner*—Ramon O. Ramirez
*Assistant Examiner*—Willie Berry, Jr.
*Attorney, Agent, or Firm*—Kenneth Jack

[57] ABSTRACT

A fishing rod holder comprising a rod supporting bar; a foregrip cradling means fixedly attached to the forward end of the rod supporting bar; a handle retaining means fixedly attached to the rearward end of the rod supporting bar; and a plurality of rod angle adjustment tabs fixedly attached to the rod support bar, each rod angle adjustment tab being positioned and aligned so that its longitudinal midline downwardly extends from the lower surface of the rod supporting bar, each rod angle adjustment tab being further positioned and aligned so that the angle between its longitudinal midline and the longitudinal midline of the rod supporting bar differs from that of each of the other rod angle adjustment tabs.

9 Claims, 7 Drawing Sheets

FISHING ROD HOLDER

FIELD OF THE INVENTION

The instant invention relates to devices adapted for holding the handle, reel seat, and foregrip portion of a fishing rod so that the rod portion of the fishing rod may extend over water, for hands free fishing.

BACKGROUND OF THE INVENTION

A common fishing rod comprises a handle having a rearward butt and a forward foregrip. Extending forwardly from the forward end of the foregrip is a flexible fiberglass or graphite fiber rod having a series of graduated line guides attached thereto along the length thereof. Between the butt and foregrip of such a typical fishing rod is a reel seat having a forward hood, a rearward reel seat ring, and a threaded lock ring; the combination of the lock ring, reel seat ring, and hood being adapted for securely holding the foot of a spin casting reel. When such a fishing rod is used by, for example, a right-handed operator, the operator's left hand grasps the butt end of the handle while the operator's right hand alternately and selectively grasps the foregrip or the crank handle of the spin cast reel. With hands in such positions, such an operator may "play" a hooked fish or may maneuver and position the fishing line extending through the graduated guides along the pole; maneuvering and positioning bait, hooks, lures, and bobbers, etc., which may be attached to the end of such line.

Commonly, during the time that such an operator spends fishing, it is necessary that the operator's hands be actively engaged upon the handle, foregrip, and reel only a fraction of the time. During times when it is not necessary for the operator's hands to engage and operate the rod, it is convenient and advantageous to provide some rod holding and positioning means separate from the operator's hands. Utilization of such means allows an operator to fish several rods at once, or allows an operator while fishing with a single rod to continue fishing while performing other tasks such as cutting and preparing bait.

Such rod holding apparatuses are known, but few if any include combined advantages of economy and ease in construction, durability, adjustability of rod angle, and interchangeability of vertical support elements. The instant inventive fishing rod holder provides all of such features.

PRIOR ART PATENTS

U.S. Pat. No. 3,906,653 issued Sep. 23, 1975, to Williams discloses a fishing rod holder having an adjustment mechanism providing adjustability through the engagement of locking pawls with radial teeth.

U.S. Pat. No. 5,501,028 issued Mar. 26, 1986, to Hull, et al., discloses a fishing rod holder with bite signaling means.

U.S. Pat. No. 2,530,265 issued Dec. 17, 1946, to Phalen discloses a fishing rod holder having an angle adjustment mechanism comprising a bolt and a wing nut.

U.S. Pat. No. 2,704,412 issued Mar. 22, 1955, to Davis discloses a fishing rod holder having no angle adjustment means.

U.S. Pat. No. 2,515,426 issued Jul. 18, 1950, to Rogers discloses a fishing rod holder having an angular adjustment means comprising a bolt and a wingnut.

U.S. Pat. No. 358,527 issued Mar. 1, 1887, to Zwoyer discloses a fishing rod holder having an angular adjustment means comprising a semi-circular notched plate adapted for engagement with an upwardly oriented cog.

None of the above disclosed inventions teach, disclose, or describe the novel, useful, inventive, and unique aspects, elements and features of the present invention.

SUMMARY OF THE INVENTION

The instant inventive fishing rod holder comprises an upper support bracket formed from an oblongated rectangular piece of sheet steel or sheet aluminum having an upturned forward end and an upturned rearward end. The upturned forward end is modified to form a "U" shaped bracket for cradling and retaining the foregrip of a fishing rod; and the upturned rearward end is modified to form a loop for receiving and retaining the butt of the fishing rod. Extending downward from the lower surface of the upper support bracket are a series of differently angled rod angle adjustment tabs. Each rod angle adjustment tab is fitted for slidable mounting within a vertical channel within an adjustment tab receiving bracket. Fixedly attached to the lower end of the adjustment tab receiving bracket is a supporting means such as a ground spike, a pier railing engaging "L" bracket, or a swivel pin fitted and sized for mounting within a vertical aperture associated with the gunwale of a small boat.

In operation, observing for example the use of the fishing rod holder on a pier railing, the pier rail engaging "L" bracket is securely attached to a fishing pier rail by means of ropes or shock cord so that the adjustment tab receiving bracket is upwardly oriented. One of the rod angle adjustment tabs of the upper support bracket is slidably mounted within the vertical channel of the adjustment tab receiving bracket. Selection of the particular rod angle adjustment tab member supporting the upper support bracket depends upon the angle at which the fisherman desires to hold the fishing rod. Upon mounting of a rod angle adjustment tab within the vertical channel, the butt of the fishing rod is inserted through the rearward loop of the upper support bracket, and the foregrip is allowed to rest upon the floor of the "U" bracket at the forward end of the upper support bracket. Such floor acts as a fulcrum, with the outwardly extending rod portion of the fishing rod acting as a lever arm pressing the butt of the fishing rod against the upper interior surface of the rearward loop, thereby holding the fishing rod in place. The fishing rod may be easily removed from the upper support bracket by grasping the fishing rod handle and pulling upward, with a slight forward motion, causing the butt of the fishing rod to clear the loop. The angle of a fishing rod held by the rod holder may be easily adjusted by inserting an alternately angled rod angle adjustment tab into the channel of the adjustment tab receiving bracket. Specially adapted interchangeable support brackets for supporting the upper support bracket upon pond banks and upon boat gunwales are preferably provided.

Accordingly, it is an object of the instant inventive fishing rod holder to provide such a holder capable of angular adjustment of a fishing rod through interchangeable engagement of differently angled support tabs with a tab receiving channel.

It is a further object of the instant invention to provide such a fishing rod holder providing for interchangeability of holder supporting means, allowing for utilization of the fishing rod holder upon pier railings, upon pond banks, and upon boat gunwales.

It is a further object to provide such a fishing rod holder which is economically and inexpensively constructed.

It is a further object of the present invention to provide such a fishing rod holder which is durable.

Other and further objects, benefits, and advantages of the present inventive fishing rod holder will become known to those skilled in the art upon review of the Detailed Description which follows, and upon review of the appended drawings.

DETAILED DESCRIPTION OF THE PREFERRED EMBODIMENT

Figure 1:
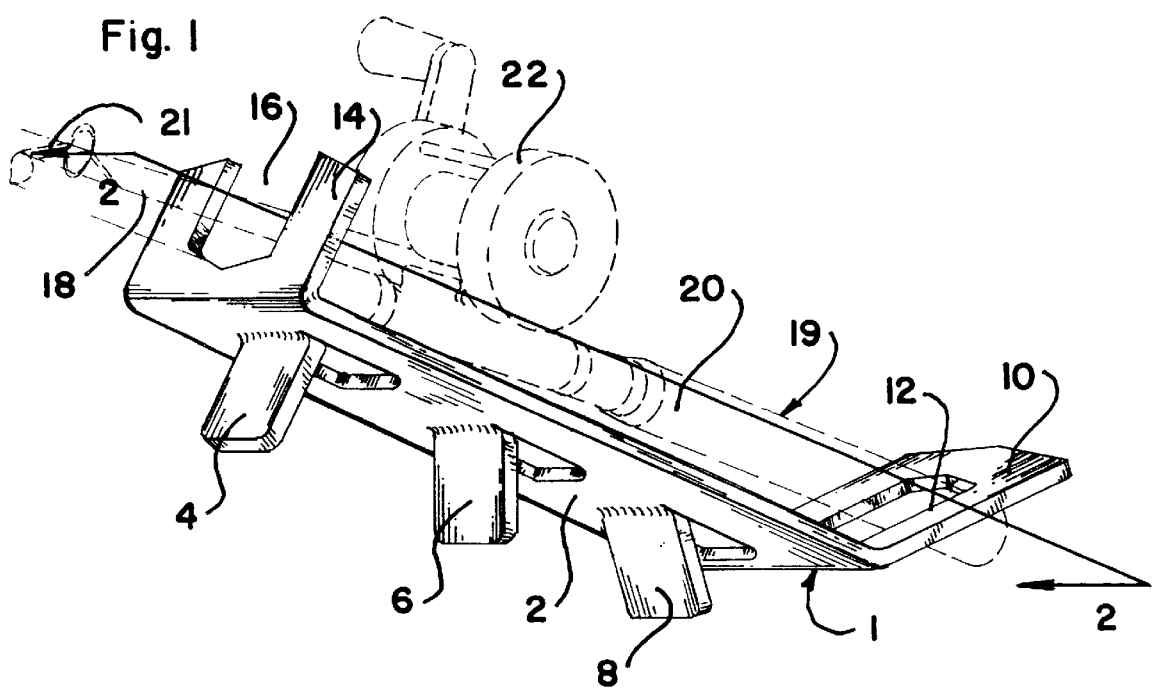
FIG. 1 is an isometric view of an upper support bracket.

Referring now to the drawings, and in particular to FIG. 1, the upper support bracket 1 of the fishing rod holder preferably is formed and cut from a single rectangular piece of sheet steel or sheet aluminum. A series of three rod angle adjustment tabs 4, 6 and 8 are formed from "U" shaped cuts in the floor 2 of the upper support bracket 1, each rod angle adjustment tab being downwardly bent to extend downwardly at differing angles with respect to the plane of the floor 2. The forward end of the upper support bracket 1 is upwardly bent and cut to form a U-bracket 14, and the rearward end of the upper support bracket 1 is upwardly bent and cut to form a handle retaining loop 10.

Figure 2:
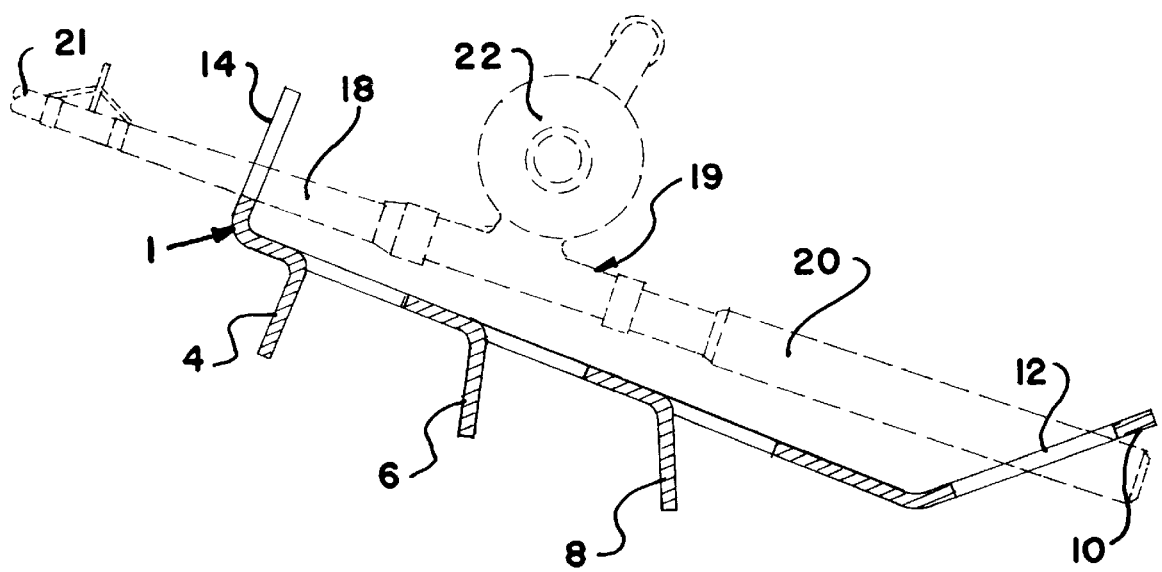
FIG. 2 is a side sectional view of the upper support bracket depicted in FIG. 1.

In use, referring to FIG. 1, the foregrip 18 of the fishing rod 19 having a reel 22 rests within the interior space 16 of the U-bracket 14; while the handle 20 of the fishing rod 19 extends through the opening 12 of the handle retaining loop 10. Referring to FIG. 2, the rod 21 acts as a lever arm pressing the foregrip 13 downward upon the floor of the U-bracket 14 which acts as a fulcrum, causing the upper surface of the handle 20 to press against the lower interior surface of the handle retaining loop 10, thereby holding the fishing rod 19 securely in place.

Figure 3:
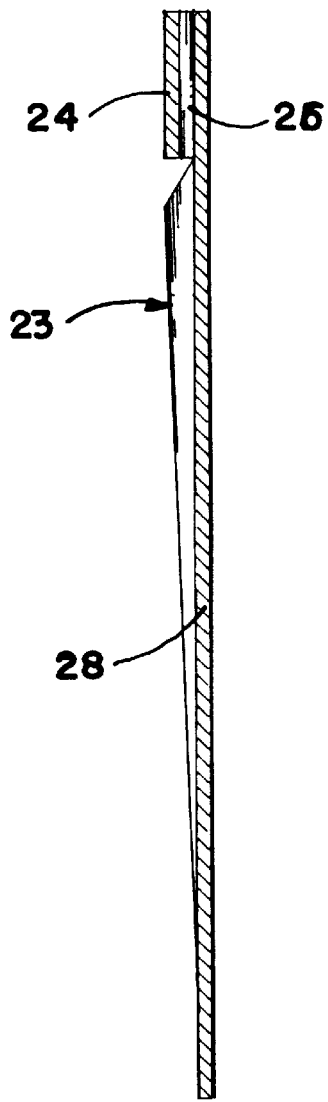
FIG. 3 is a side sectional view of a spike support.

Referring to FIG. 3, a spike support 23 has an upper adjustment tab receiving bracket 24, such bracket having a channel 26 extending from its upper end to its lower end. Preferably, the channel 26 is fitted so that it may receive and securely hold, referring to FIG. 1, any of the rod angle adjustment tabs 4, 6 or 8. Referring again to FIG. 3, extending downward from the lower end of the adjustment tab receiving bracket 24 is a spike 28 which is adapted to be driven or pressed into a grassy, sandy, or muddy bank of a fishing pond or lake. Preferably, referring to FIGS. 4 and 5 simultaneously, the spike support 23, like the upper support bracket, is formed and cut from a single piece of sheet steel or sheet aluminum; the adjustment tab receiving bracket 24 being formed by inwardly folding metal leaves to form the channel 26.

Figure 6:
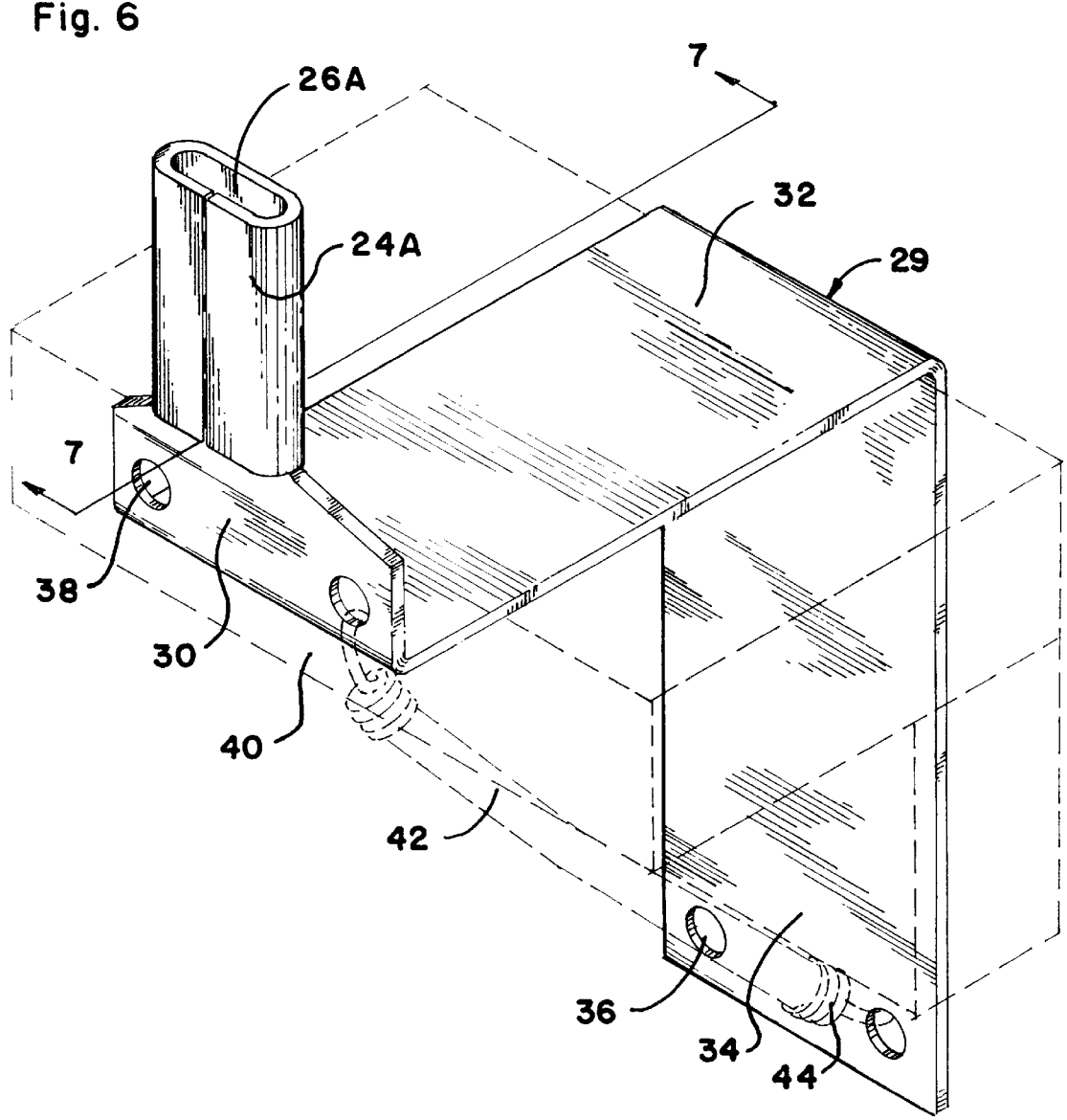
FIG. 6 is an isometric view of a rail support.
Figure 7:
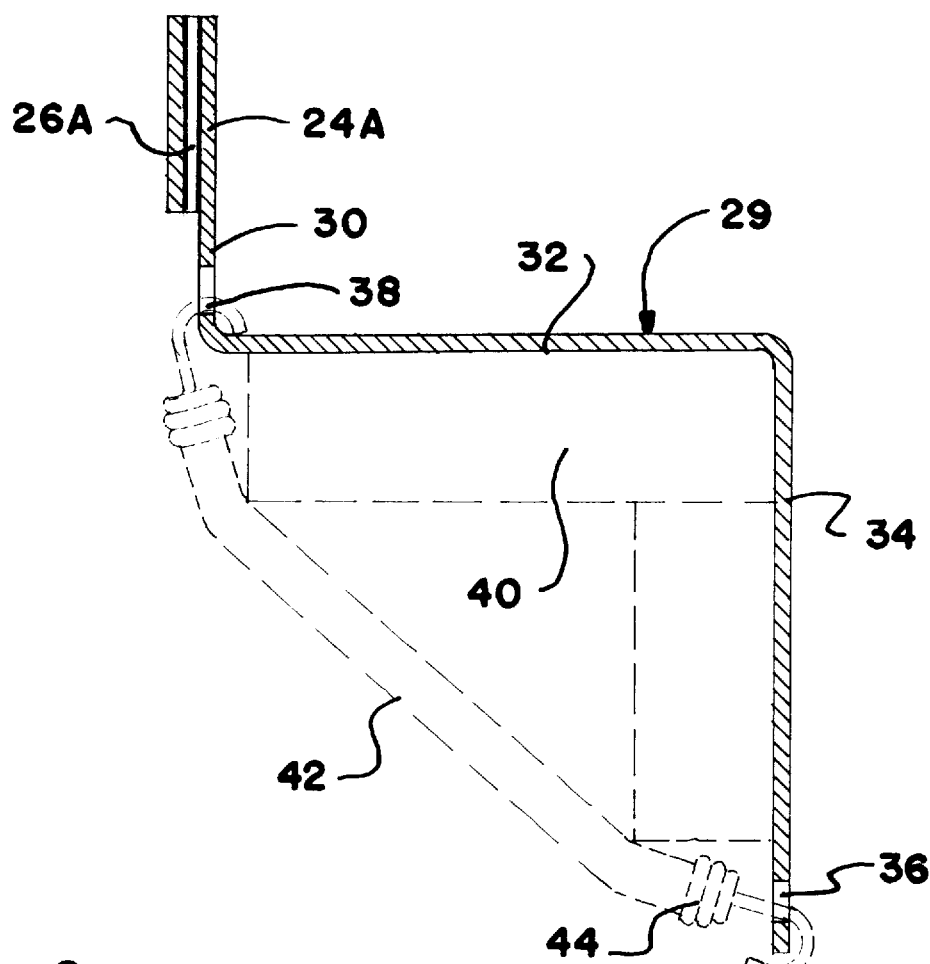
FIG. 7 is a side sectional view of the rail support depicted in FIG. 6.
Figure 8:
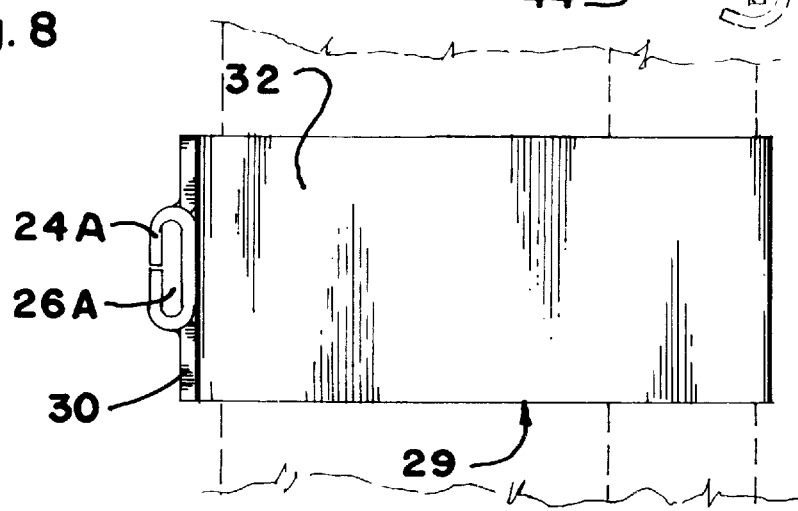
FIG. 8 is an upper plan view of the rail support depicted in FIG. 6.

Referring to FIG. 6, the adjustment tab receiving bracket 24A and channel 26A are identical with the adjustment tab receiving bracket 24 and channel 26 depicted in FIG. 3. Like the upper support bracket and the spike support, the rail support also preferably is cut and formed from a single piece of sheet steel or aluminum; the forward end of the rail support 29 being upwardly bent to form a bracket support section 30, and the rearward end of the rail support 29 being downwardly bent to form a rail engaging flange 34, leaving a horizontal floor 32. Apertures 38 are drilled through the bracket support section 30 and apertures 36 are drilled through the rail engaging flange 34. Such apertures 38 and 36 allow the rail support 29 to be securely attached to a fishing pier rail 40 by means of a stretchable shock cord 42 having hooks 44 at either end, or by other tie down means. Referring to FIG. 7, the rail engaging flange 34 preferably is of sufficient length to allow its apertures 36 to clear the lower edge of the rail 40, allowing for attachment of the hook 44 of the stretchable shock cord 42. Referring to FIG. 8, the adjustment tab receiving bracket 24A is shown forming the channel 26A by inwardly bending metal leaves to form a channel.

Figure 9:
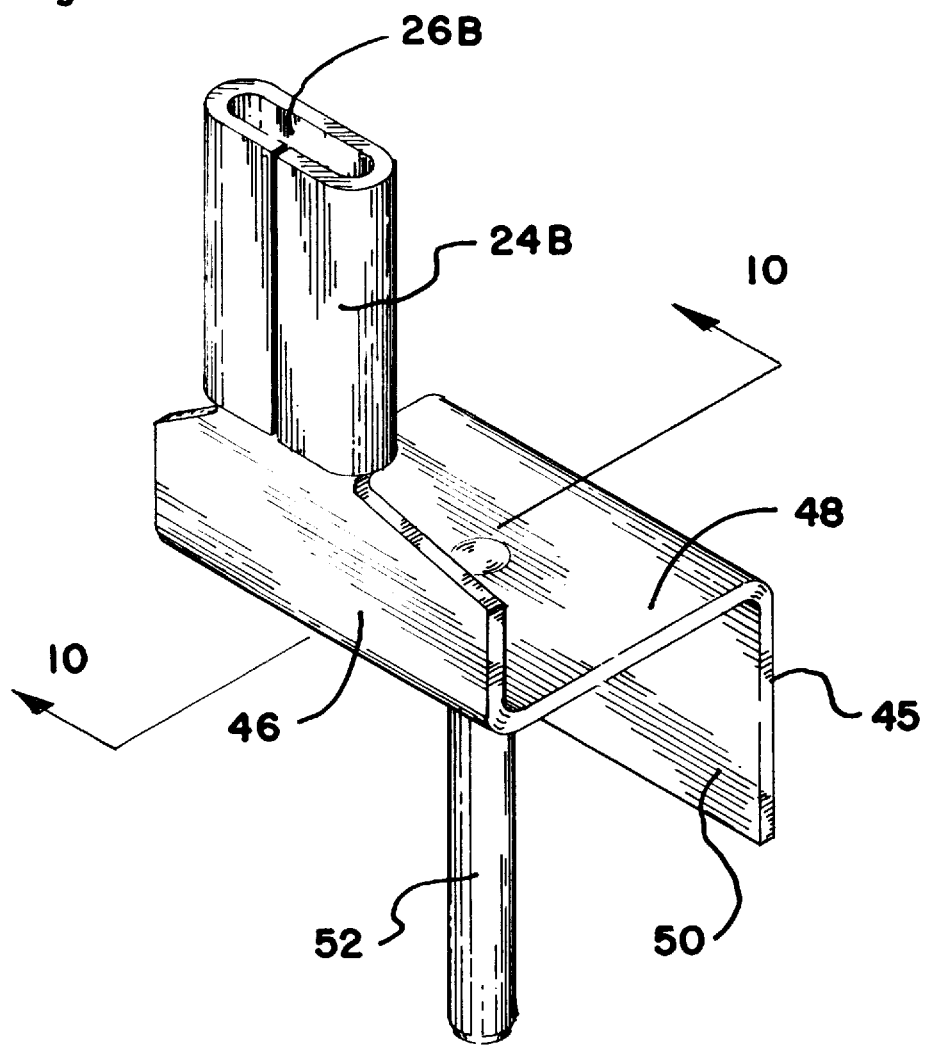
FIG. 9 is an isometric view of a boat gunwale support.

Referring to FIG. 9, the adjustment tab receiving bracket 24B and channel 26B of the boat gunwale support 45 are identical to those of the spike support and the rail support. Downwardly extending from the lower end of the adjustment tab receiving bracket 24B is a bracket support section 46. Extending rearwardly therefrom is a floor 48, and extending downwardly therefrom is a gunwale engaging flange 50. A swivel pin 52 extends downwardly from and is fixedly attached to the lower surface of the floor 48.

Figure 10:
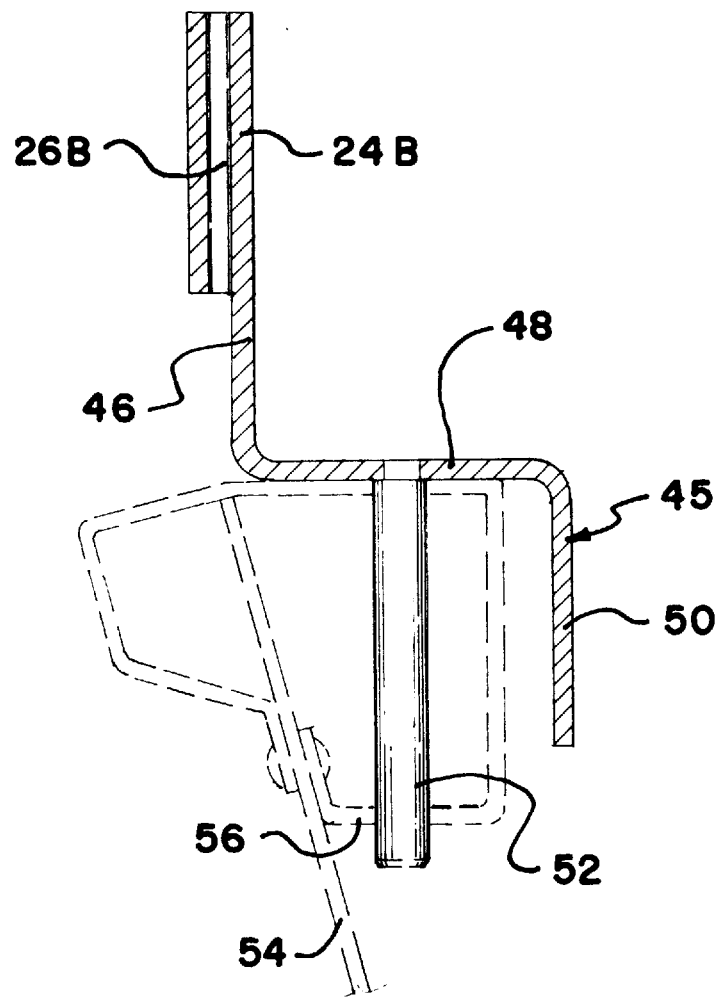
FIG. 10 is a side sectional view of the boat gunwale support depicted in FIG. 9.
Figure 11:
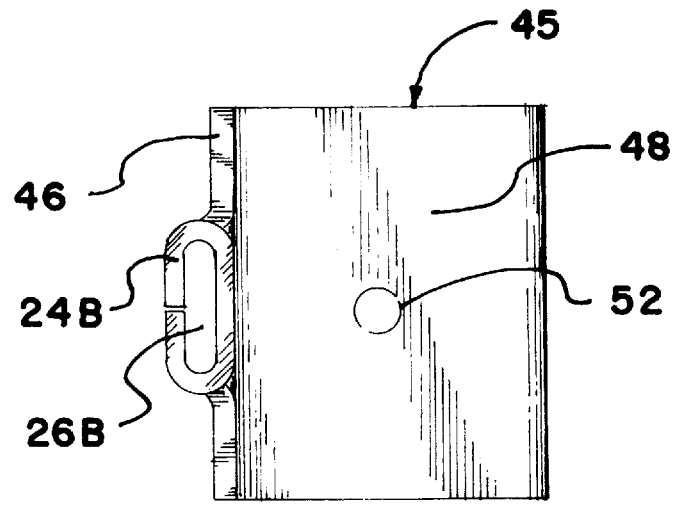
FIG. 11 is an upper plan view of the boat gunwale support depicted in FIG. 9.

Referring to FIG. 10, the swivel pin 52 is fitted for mounting within a typical oarlock socket 56 attached to the gunwale 54 of a rowboat. Alternately, the swivel pin 52 may be slidably and pivotally mounted within any suitable vertically oriented aperture within the gunwale of a boat. Referring to FIG. 11, the channel 26B of the adjustment tab receiving bracket 24B is similarly formed by inwardly bending leaves to form the channel.

Figure 4:
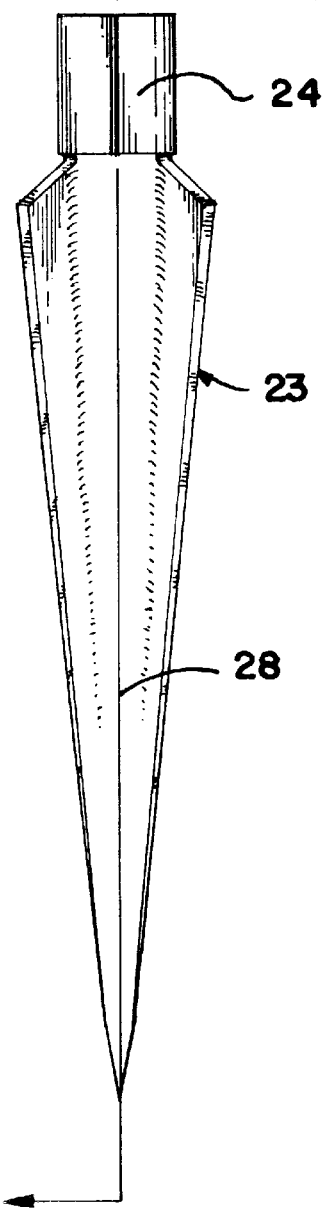
FIG. 4 is a side view of the spike support depicted in FIG. 3.
Figure 5:
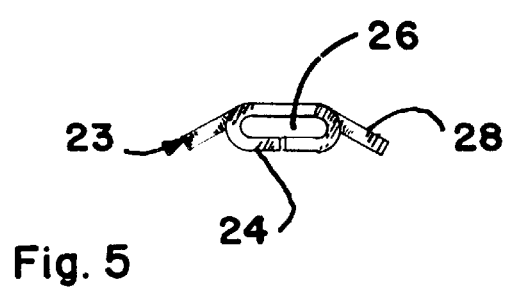
FIG. 5 is an upper plan view of the spike support depicted in FIG. 3.

In operation, referring simultaneously to FIGS. 4, 6, and 9, a fisherman selects either the spike support 23, the rail support 29, or the boat gunwale support 45 depending upon fishing site location. Where the fishing site is a pond bank, spike support 23 is selected; where the fishing site is a fishing pier, rail support 29 is selected; and where the fishing site is a boat, boat gunwale support 45 is selected. Referring to FIG. 3, upon selection of the spike support 23, the lower tip of the spike 28 is driven downwardly into the ground. Referring to FIG. 7 where the rail support 29 is selected, its floor 32 is caused to rest upon the upper surface of a fishing pier rail 40, causing the rail engaging flange 34 to extend downward below the lower surface of the rail 40. With the rail support 29 so positioned, the hooks 44 of a length of shock cord 42 are engaged with apertures 38 and 36, causing the cord 42 to extend across the undersurface of the rail 40, securing the rail support 29 in place. Referring to FIG. 10, where the boat gunwale support 45 is selected, its swivel pin 52 is slidably inserted into an oarlock socket 56 of the gunwale 54, or slidably inserted with any other appropriately fitted vertically oriented aperture.

Referring simultaneously to FIGS. 1, 3, 6, and 9, upon selection and appropriate installation of the spike support 23, the rail support 29 or the boat gunwale support 45, as the case may be, one of the rod angle adjustment tabs 4, 6, or 8 is slidably inserted into the upper opening of the channel 26, 26A or 26B, as the case may be. Since the rod angle adjustment tabs 4, 6 and 8 are variably angled with respect to the plane of the floor 2, such tabs may be selected for adjustment of the angle of the fishing rod 19.

In order to adjust or change the angle of the fishing rod 19, the fishing rod 19 and the upper support bracket 1 are raised upwardly causing the installed rod angle support tab to withdraw from the channel 26, 26A or 26B, as the case may be, and a differently angled rod angle adjustment tab 4, 6, or 8 is slidably inserted into such channel.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A fishing rod holder for holding a fishing rod having a handle, a reel seat, and a foregrip, the fishing rod holder comprising:

(a) A rod supporting bar having a forward end, a rearward end, an upper surface, a lower surface, and a longitudinal midline extending from its forward end to its rearward end;

(b) a foregrip cradling means fixedly attached to or homogeneously fused with the forward end of the rod supporting bar, the foregrip cradling means being capable of retaining the foregrip of such a fishing rod;

(c) a handle retaining means fixedly attached to or homogeneously fused with the rearward end of the rod supporting bar, the handle retaining means being capable of retaining the handle of such a fishing rod; and, (d) a plurality of rod angle adjustment tabs fixedly attached to or homogeneously fused with the rod supporting bar, each rod angle adjustment tab having an upper end, a lower end, and a longitudinal midline extending from its upper end to its lower end, the rod angle adjustment tabs being positioned and aligned so that their longitudinal midlines downwardly extend from the lower surface of the rod supporting bar, each rod angle adjustment tab being further positioned and aligned so that the angle between its longitudinal midline and the longitudinal midline of the rod supporting bar differs from that of each of the other rod angle adjustment tabs.

2. The fishing rod holder of claim 1, wherein the foregrip cradling means comprises a "U" shaped upwardly extending and upwardly opening bracket.

3. The fishing rod holder of claim 2, wherein the handle retaining means comprises an upwardly extending loop.

4. The fishing rod holder of claim 3, wherein the size and shape of each rod angle adjustment tab is substantially uniform with that of each other rod angle adjustment tab.

5. The fishing rod holder of claim 4, further comprising a support bracket, the support bracket having an upper end, a lower end, and a tab receiving channel extending from its upper end to its lower end, the tab receiving channel being fitted for and being capable of selectively, and angularly adjustably receiving and retaining each rod angle adjustment tab; one of the rod angle adjustment tabs being slidably mounted within the tab receiving channel.

6. The fishing rod holder of claim 5, further comprising a bracket assembly supporting means fixedly attached to or homogeneously fused with the lower end of the support bracket, the bracket assembly supporting means being capable of fixedly positioning the support bracket so that its upper end extends upwardly.

7. The fishing rod holder of claim 6, wherein the bracket assembly supporting means comprises a tapered spike.

8. The fishing rod holder of claim 6, wherein the bracket assembly supporting means comprises a metal plate adapted for fixed attachment to a fishing pier railing.

9. The fishing rod holder of claim 6, wherein the bracket assembly supporting means comprises a pin adapted for slidable mounting within a pin receiving aperture.

* * * * *